United States Patent
Inoue

(10) Patent No.: US 12,023,625 B2
(45) Date of Patent: Jul. 2, 2024

(54) ABSORPTION-TYPE REMOVAL AND CONCENTRATION DEVICE

(71) Applicant: SEIBU GIKEN CO., LTD., Fukuoka (JP)

(72) Inventor: Koji Inoue, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 311 days.

(21) Appl. No.: 17/637,709

(22) PCT Filed: Mar. 11, 2020

(86) PCT No.: PCT/JP2020/010618
§ 371 (c)(1),
(2) Date: Feb. 23, 2022

(87) PCT Pub. No.: WO2021/181579
PCT Pub. Date: Sep. 16, 2021

(65) Prior Publication Data
US 2022/0274051 A1    Sep. 1, 2022

(30) Foreign Application Priority Data
Mar. 11, 2020   (JP) .................... 2020-041820

(51) Int. Cl.
*F25D 17/06* (2006.01)
*B01D 53/18* (2006.01)
(Continued)

(52) U.S. Cl.
CPC .............. *B01D 53/18* (2013.01); *F24F 3/14* (2013.01); *F24F 7/08* (2013.01)

(58) Field of Classification Search
CPC .............. B01D 53/18; F24F 3/14; F24F 7/08
(Continued)

(56) References Cited

U.S. PATENT DOCUMENTS

| 10,201,776 B2 | 2/2019 | Kuroda et al. |
| 2012/0000365 A1 | 1/2012 | Okano et al. |

(Continued)

FOREIGN PATENT DOCUMENTS

| JP | 3009018 | 2/2000 |
| JP | 2009-52753 | 3/2009 |

(Continued)

OTHER PUBLICATIONS

"Carbon Dioxide Recovery Technology Advancement Project Achievement Report" Research Institute Innovative Technology for the Earth; 2010.

(Continued)

*Primary Examiner* — Davis D Hwu
(74) *Attorney, Agent, or Firm* — STAAS & HALSEY LLP

(57) ABSTRACT

An absorption type carbon dioxide removal and concentration device can remove or concentrate a carbon dioxide throughout four seasons and can be manufactured with a relatively simple structure. The device includes a carbon dioxide removal rotor that holds a carbon dioxide absorbent. The rotor is divided into at least a treatment zone and a regeneration zone. Air to be treated is ventilated through the treatment zone, so that carbon dioxide contained in the air to be treated is absorbed by a holding absorbent of the rotor portion, so that the $CO_2$ can be separated and removed from the air to be treated. In the regeneration zone, regeneration air is ventilated, so that the carbon dioxide absorbed by the holding absorbent in the treatment zone is desorbed with the regeneration air to regenerate the holding absorbent. A total heat exchanger recovers latent heat and sensible heat from the regeneration exhaust.

22 Claims, 1 Drawing Sheet

(51) Int. Cl.
*F24F 3/14* (2006.01)
*F24F 7/08* (2006.01)

(58) Field of Classification Search
USPC .............................................. 62/94
See application file for complete search history.

(56) References Cited

U.S. PATENT DOCUMENTS

2016/0175772 A1  6/2016  Maruyama et al.
2017/0252693 A1  9/2017  Kuroda et al.

FOREIGN PATENT DOCUMENTS

| | | |
|---|---|---|
| JP | 2012-5943 | 1/2012 |
| JP | 5795423 | 10/2015 |
| JP | 2017-75715 | 4/2017 |
| JP | 2017075715 A * | 4/2017 |
| JP | 2017-154063 | 9/2017 |
| JP | 2019-62862 | 4/2019 |
| JP | 6578492 | 9/2019 |
| WO | 2021/181579 A1 | 6/2021 |

OTHER PUBLICATIONS

International Search Report dated May 19, 2020, in corresponding International Patent Application No. PCT/JP2020/010618.
Written Opinion of the International Searching Authority dated May 19, 2020, in corresponding International Patent Application No. PCT/JP2020/010618.

* cited by examiner

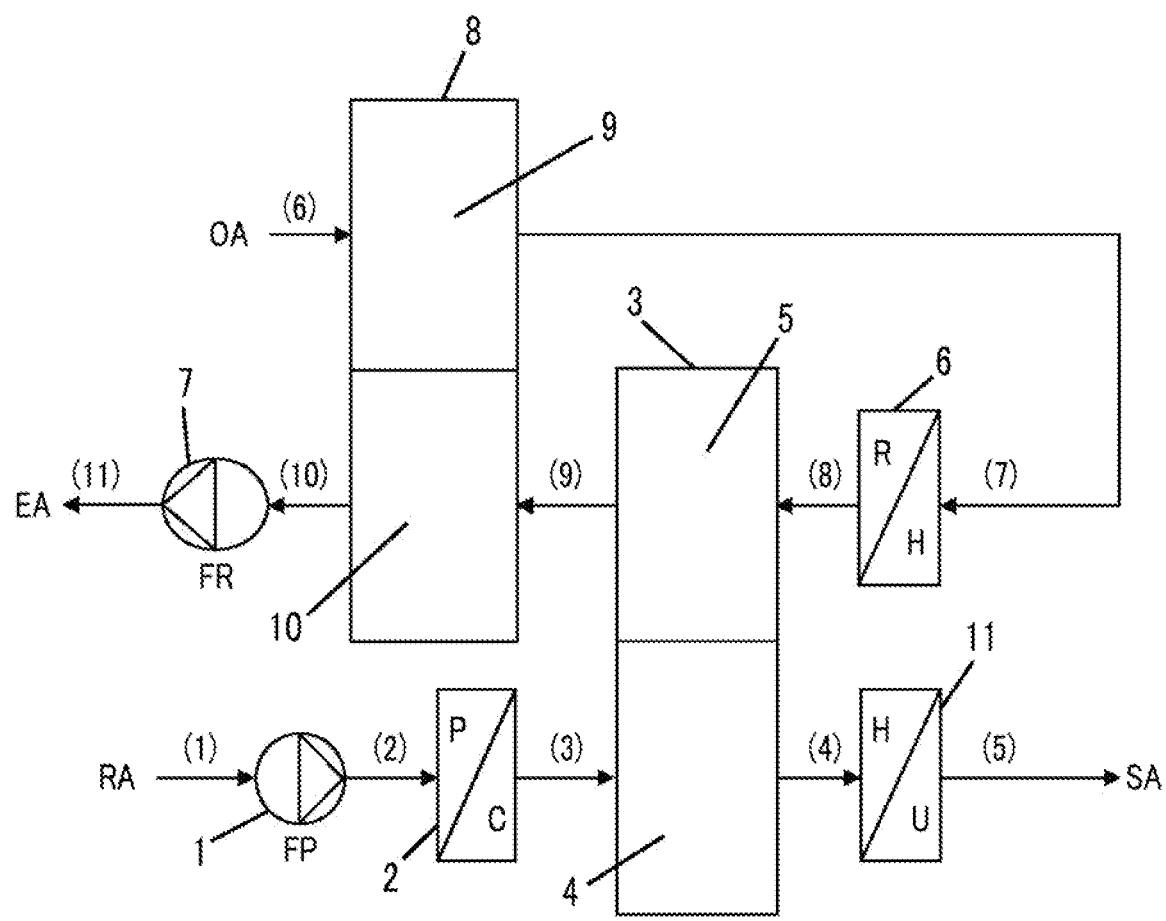

ABSORPTION-TYPE REMOVAL AND CONCENTRATION DEVICE

CROSS-REFERENCE TO RELATED APPLICATIONS

This application is a U.S. National Stage Application, which claims the benefit under 35 U.S.C. § 371 of International Patent Application No. PCT/JP2020/010618 filed Mar. 11, 2019, which claims the foreign priority benefit under 35 U.S.C. § 119 of Japanese Patent Application No. 2020-41820 filed, Mar. 11, 2020 the contents of which are incorporated herein by reference.

BACKGROUND

An absorption type removal and concentration device can remove and concentrate carbon dioxide according to the purpose, such as the purpose of removing carbon dioxide in a building or the like, and the purpose of supplying concentrated high-concentration carbon dioxide to a greenhouse or a plant factory by, for example, using a rotor holding a carbon dioxide absorbent such as an amine-impregnated porous material and a weakly basic anion exchange resin to separate carbon dioxide contained in the air to be treated from the air to be treated by using the enthalpy difference between the air to be treated and the regenerated air.

In the related art, as a device that can separate and remove a gaseous substance to be removed from the air to be treated at a low temperature, for example, as seen in Japanese Patent No. 5795423, an absorption type removal and concentration device is known that can secure a substance recovery rate of the device while suppressing the regeneration energy by humidifying the regenerated air at low temperature by using a breathable adsorption rotor holding an amine-supported solid absorbent.

In addition, in JP-A-2017-154063 to which the technique of Japanese Patent No. 5795423 is applied, an absorption type removal and concentration device is proposed that can control the removal amount of a substance to be removed from the device by controlling the enthalpy of the regeneration air (both temperature and humidity) and the enthalpy of the air to be treated (both temperature and humidity) using a rotor holding a carbon dioxide absorbent, such as an amine-supported solid absorbent.

Furthermore, at present, a chemical absorption method using an aqueous amine solution is known as one of the carbon dioxide separation and recovery techniques. Since the aqueous amine solution requires enormous energy to separate carbon dioxide from the aqueous amine solution absorbed carbon dioxide (heat regeneration of the aqueous amine solution), reduction of the regeneration energy is desired. As one of the solutions, the development of the solid absorbent is in progress. Since the solid absorbent is an aqueous solution system when the aqueous amine solution is regenerated, it is possible to reduce the extra energy required for heating and cooling the water.

A carbon dioxide absorption process using an aqueous amine solution is generally shown by the following formula as seen in 2010 Carbon Dioxide Recovery Technology Advancement Project Achievement Report Research Institute of Innovative Technology for the Earth.

Primary amine (R—NH$_2$)

$$2R\text{—}NH_2+CO_2 \Leftrightarrow R\text{—}NH_3^+ + R\text{—}NH\text{—}COO^- \quad [1]$$

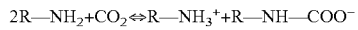

$$R\text{—}NH_2+CO_2+H_2O \Leftrightarrow R\text{—}NH_3^+ + HCO_3^- \quad [2a]$$

$$R\text{—}NH\text{—}COO^- + H_2O \Leftrightarrow R\text{—}NH_2 + HCO_3^- \quad [2b]$$

Secondary amine (R$_1$R$_2$—NH)

$$2R_1\text{—}R_2\text{—}NH+CO_2 \Leftrightarrow R_1R_2\text{—}NH^+ + R_1R_2\text{—}N\text{—}COO^- \quad [3]$$

$$R_1R_2\text{—}NH+CO+CO_2+H_2O \Leftrightarrow R_1R_2\text{—}NH_2^+ + HCO_3^- \quad [4a]$$

$$R_1R_2\text{—}N\text{—}COO^- + H_2O \Leftrightarrow R_1R_2\text{—}NH + HCO_3^- \quad [4b]$$

When the carbon dioxide absorbing liquid can absorb carbon dioxide by the second routes [2a] [2b] [4a] [4b], the heat of reaction is smaller than the reaction shown in [1] or [3], and there is a merit that the energy of desorption regeneration can be reduced. That is, in a case where an amine-supported solid absorbent is used, it is considered that the reaction shown by [2a] [2b] [4a] [4b] occurs, for example, under low temperature conditions such as absorption Celsius 15° C. (hereinafter, all temperatures are referred to as "Celsius") and desorption 45° C. However, since these reactions proceed in the presence of water, the coexistence of water (moisture) is essential.

Since the tertiary amine does not have an NH bond, the reaction shown here does not occur, and does not exhibit carbon dioxide absorption and desorption performance under low temperature conditions such as absorption at 15° C. and desorption at 45° C.

Amine-based carbon dioxide absorbents also have problems of odor and thermal deterioration due to oxidative decomposition, and it is important to lower the regeneration temperature in order to reduce these problems.

SUMMARY

The one disclosed in Japanese Patent No. 5795423 uses a honeycomb rotor holding an absorbent that requires the coexistence of water such as an amine-supported solid absorbent, and humidifies the regeneration air in a regeneration zone to improve the carbon dioxide removal performance while lowering the temperature of the regeneration air. In addition, by regenerating at a low temperature, the problems of oxidative deterioration and odor of the amine-based carbon dioxide absorbent are reduced.

However, in the case of Japanese Patent No. 5795423, it was unclear what kind of control method was used to control the absorption type removal and concentration device to obtain the substance recovery rate q of the device (that is, efficiency of separating and removing the substance to be removed from the air to be treated in the treatment zone by absorption) and the removal amount of the substance to be removed as a result, and the device could not be optimized in a case where various specifications such as design conditions and air conditions were changed.

In addition, the one disclosed in JP-A-2017-154063 controls the enthalpy (both temperature and humidity) of either or both of the air to be treated that ventilates the treatment zone of the adsorption rotor, and the regeneration air that ventilates the heating regeneration zone so that the carbon dioxide removal and concentration performance can be controlled.

However, the one described in JP-A-2017-154063 could easily increase the enthalpy of the regeneration air and enhance the carbon dioxide removal and concentration performance in the summer season when the temperature and humidity of the outside air were high (high enthalpy), or in the subtropical and tropical regions where the temperature and humidity of the outside air were high all year round, but had the disadvantage that a large amount of energy was required as compared with the summer season in order to increase the enthalpy of the regeneration air and enhance the carbon dioxide removal and concentration performance, in winter season when the temperature and humidity of the outside air were low (low enthalpy). In addition, paragraph 0016 described that the water and heat desorbed in the regeneration zone, and moisture and temperature were recovered and supplied to the regeneration inlet by a total heat exchanger or the like, but it was not clarified specifically what type of configuration the device has and how to operate the device when there are four seasons like Japan and the outside air conditions change significantly.

In view of this situation, a main subject is to provide an absorption type removal and concentration device that can appropriately maintain the removal amount of substances to be removed by the device throughout the four seasons using a rotor holding a carbon dioxide absorbent, such as an amine-supported solid absorbent, by exchanging total heat between the air exhausted from the regeneration outlet and the regeneration air and sufficiently recovering latent heat and sensible heat from the exhaust air to increase the enthalpy of the regeneration air in winter season.

In order to solve the above problems, there is provided an absorption type removal and concentration device including a rotor that holds a carbon dioxide absorbent, in which the rotor is divided into at least a treatment zone and a regeneration zone, air to be treated is ventilated through the treatment zone, so that a carbon dioxide contained in the air to be treated is absorbed by a holding absorbent of a rotor portion, separated and removed from the air to be treated, and in the regeneration zone, regeneration air in which a latent heat and a sensible heat of regeneration exhaust are recovered with a total heat exchanger is ventilated, so that the carbon dioxide absorbed by the holding absorbent in the treatment zone is desorbed with the regeneration air to regenerate the holding absorbent of the rotor portion.

By using a honeycomb rotor supporting a carbon dioxide absorbent such as an amine-supported solid absorbent, the absorption performance of the carbon dioxide in the treatment zone can be exhibited by causing the enthalpy of the air to be treated lower than the enthalpy of the regeneration air, and the desorption performance in the regeneration zone can be exhibited by causing the enthalpy of the regeneration air higher than the enthalpy of the air to be treated. In this manner, using the principle of absorption and desorption of a target object by the difference in enthalpy (hereinafter referred to as "enthalpy swing absorption" or "ESA"), the removal and concentration performance in the absorption type removal and concentration device is exhibited.

As temperature control devices to adjust the enthalpy, a cooling coil, a heating coil, a Peltier device, an electric heater, a steam heater, a condenser of a heat pump as a heating device, an evaporator as a cooling device, and the like are used. In addition, as a humidifying device in a case where the humidity of the air supply supplied to the room is low, various methods such as a water heating type, a vaporization type, a water spray type, and an ultrasonic type are used, and condensed water generated by an evaporator of a heat pump may be used.

In addition, in order to improve the carbon dioxide concentration efficiency in the regeneration zone, a regeneration circulation system path may be provided to return a part of the air emitted from the regeneration zone to the front of the regeneration zone.

In addition, in order to improve the carbon dioxide removal rate in the treatment zone, a treatment circulation system path may be provided to return a part of the air emitted from the treatment zone to the front of the treatment zone.

The absorption type removal and concentration device proposed by the inventor is configured as described above, air to be treated is ventilated through the treatment zone, so that the carbon dioxide contained in the air to be treated is absorbed by the holding absorbent of the rotor portion, separated and removed from the air to be treated, and in the regeneration zone, the regeneration air in which the latent heat and the sensible heat of the regeneration exhaust are recovered with the total heat exchanger is ventilated, so that the carbon dioxide absorbed by the holding absorbent in the treatment zone is desorbed with the regeneration air to regenerate the holding absorbent of the rotor portion. When the holding absorbent is regenerated, the holding absorbent is regenerated by the difference in enthalpy between the air flowing through the treatment zone and the air flowing through the regeneration zone, so that the holding absorbent can be sufficiently regenerated even when the temperature of the air flowing through the regeneration zone is low. Therefore, even when an amine-based carbon dioxide absorbent is used, deterioration of the absorbent can be suppressed.

When the return air in the room is passed through the treatment zone of the proposed absorption type removal and concentration device, the carbon dioxide concentration of the outlet air is low, and the carbon dioxide concentration in the room can be lowered by supplying the return air to a room such as a building where the carbon dioxide concentration is high. In this case, since the amount of outside air introduced to reduce the carbon dioxide concentration in the room can be significantly reduced, energy saving is achieved as compared with normal ventilation. In addition, since the carbon dioxide concentration is high in the regeneration outlet air passed through the regeneration zone of the absorption type removal and concentration device proposed by the inventor, when guided to a plant growing room such as a greenhouse or a plant factory, the plants grow faster and it is possible to suppress the release of carbon dioxide to the environment. The carbon dioxide with high concentration in the regeneration zone may be supplied to the greenhouse while removing carbon dioxide in the room using both the regeneration outlet air and the treatment outlet air treated by the proposed absorption type removal and concentration device. For example, in the proposed absorption type removal and concentration device, it is also possible to circulate and air-condition carbon dioxide by air-conditioning the building with the treatment outlet air and supplying carbon dioxide generated indoors from humans to a greenhouse provided on the roof of the building to promote the growth of plants.

Furthermore, the indoor air quality can be further improved by combining a honeycomb rotor with the ability to adsorb odorous substances such as volatile organic compounds (hereinafter referred to as VOC) and ammonia with a carbon dioxide absorption type removal and concentration device using ESA.

BRIEF DESCRIPTION OF THE DRAWINGS

These and/or the other aspects and advantages will become apparent and more readily appreciated from the following description of the embodiments, taken in conjunction with the accompanying drawings.

FIG. 1 is a flow chart in Example 1 of a proposed absorption type removal and concentration device.

DETAILED DESCRIPTION OF THE PREFERRED EMBODIMENTS

The proposed absorption type removal and concentration device includes a rotor holding an amine-supported solid absorbent having a carbon dioxide absorbing function, and divides this rotor into at least a treatment zone and a regeneration zone. It has the function of ventilating the air to be treated to the treatment zone, of separating and removing carbon dioxide from the air to be treated, and of ventilating the regeneration air, which has recovered the latent heat and sensible heat of the regeneration exhaust with a total heat exchanger, to the regeneration zone to desorb carbon dioxide.

Hereinafter, Example 1 of the proposed absorption type removal and concentration device will be described in detail with reference to FIG. 1. Reference numeral 3 is a carbon dioxide removal rotor, which is made by corrugating (waving) a nonflammable sheet such as ceramic fiber paper or glass fiber paper and winding the nonflammable sheet into a rotor shape, and supports an organic absorbent such as triethanolamine or monoethanolamine, an amine-based weakly basic anion exchange resin, or an amine-supported solid absorbent such as activated carbon supporting amine, silica gel, and mesoporous silica.

The carbon dioxide removal rotor 3 is divided into a treatment zone 4 and a regeneration zone 5. In the treatment zone 4, the return air RA from the room or the like is supplied to the supply destination such as the room by a treatment blower 1 (FP) through a cooling device 2 such as a chilled water coil or an evaporator of a heat pump.

After the air to be treated is passed through the cooling device 2 to adjust the enthalpy, the air is ventilated to the treatment zone 4, the carbon dioxide contained in the air to be treated is absorbed by the absorbent of the rotor portion to be separated and removed from the air to be treated, and the concentration of carbon dioxide is reduced. In a case where the humidity of the air supply SA to the room or the like is low, the air supply SA is humidified by a humidifying device 11 such as a water heating type, a vaporization type, a water spray type, or an ultrasonic type.

Reference numeral 8 is a total heat exchange rotor, and there are already many commercially available products, but technically, the one disclosed in Japanese Patent No. 3009018 is suitable. That is, the aluminum sheet is formed in a honeycomb shape, a moisture adsorbent is supported on the sheet, and finally a rotatable rotor shape is formed. As the moisture adsorbent, as disclosed in Japanese Patent No. 3009018, a crushed specific ion exchange resin is suitable, but the moisture adsorbent is not limited thereto. Calcium chloride, diatomaceous earth, silica gel, zeolite, polymer sorbent, and the like may be used, and only those formed into a honeycomb shape by alumite-treating the surface of an aluminum sheet may be used.

In the regeneration zone 5, the enthalpy of the outside air OA is adjusted by the heating device 6 such as a hot water coil, an electric heater, a steam heater, and a condenser of a heat pump, as the regeneration air that recovers latent heat and sensible heat in the precooling zone 10 from the air passed through the regeneration zone 5, in the preheating zone 9 of the total heat exchange rotor 8, and then ventilated into the regeneration zone 5 to desorb the carbon dioxide absorbed in the rotor into the regeneration air, and a holding absorbent in the rotor portion in the process of passing through the zone is regenerated.

The air whose latent heat and sensible heat are recovered from the regeneration outlet air in the precooling zone 10 of the total heat exchange rotor 8 is exhausted to the outside of the device as an exhaust EA by the regeneration blower 7 (FR). The total heat exchange rotor 8 may be capable of recovering total heat with a static orthogonal flow element type total heat exchanger.

In particular, when a weakly basic anion exchange resin having a primary amine and/or a secondary amine as a functional group is used as a solid absorbent, it is considered that the reaction represented by the above formulas [2a], [2b], [4a], and [4b] occurs, and a continuous dielectric model of an amine-carbon dioxide-aqueous system can be formed. That is, a solvent as a continuous dielectric is formed around the $HCO_3^-$ molecule as a solute, and the charge distribution of the solute molecule causes polarization in the surrounding solvent. In the continuous dielectric model, such an interaction between solutes and solvents promotes the formulas [2a] [2b] [4a] and [4b] under low temperature conditions, so that the reactivity such as absorption rate and emission rate is enhanced. Therefore, by humidifying at a low regeneration temperature, it behaves differently from the one in which the heated regeneration air at low temperature is humidified and the substance to be removed, which is in the adsorbed state, is expelled from the adsorbent by water, as in the technique in the related art of replacement desorption. In various tests performed so far, it is found that substantially no carbon dioxide can be removed and concentrated in a honeycomb rotor supporting an amine-supported solid absorbent having a tertiary amine as a functional group. Therefore, it is considered that carbon dioxide is removed and concentrated by the above reaction.

In Example 1, the treatment blower 1 is installed in front of the cooling device 2, but the proposal is not limited thereto, and the treatment blower 1 may be provided behind the treatment zone 4 of the carbon dioxide removal rotor 3 or behind the humidifying device 11. In addition, the regeneration blower 7 may also be provided in front of and behind the preheating zone 9 of the total heat exchange rotor 8 and in front of the precooling zone 10. In FIG. 1, the numbers in parenthesis, (1), (2), (3), etc., represent how air flows through the device, as is also clear from the arrows in FIG. 1.

In addition, a part or all of the air emitted from the treatment zone 4 may be returned to the front of the cooling device 2 to be treated and circulated to increase the amount of carbon dioxide removed.

Furthermore, a part or all of the air emitted from the regeneration zone 3 may be returned to the front of the heating device 6 to be regenerated and circulated to increase the amount of carbon dioxide removed.

In the absorption type removal and concentration device of Example 1, in the case of the treatment air volume of approximately 4,000 m³/hr required for air-conditioning one floor of a general building, Table 1 below shows the values of temperature and humidity and carbon dioxide concentration at reference numerals (1) to (11) in FIG. 1 in winter, summer, and intermediate seasons. In the present specification, it is assumed that the winter, summer, and intermediate seasons are in the following states.

<Winter Season>

State of the outside air temperature is 10° C. or less and the absolute humidity is 5 g/kg (DA) or less.

<Summer Season>

State of the temperature of the outside air is 25° C. or higher, and the absolute humidity is 15 g/kg (DA) or higher.

<Intermediate Season>

State of the temperature of the outside air and the absolute humidity between the above winter and summer seasons In the winter and intermediate seasons, the total heat exchange rotor 8 is rotated, and in the summer season, the total heat exchange rotor 8 is kept stationary without being rotated.

TABLE 1

| Reference numerals | Winter season | | | Summer season | | | Intermediate season | | |
|---|---|---|---|---|---|---|---|---|---|
| | Temperature ° CDB | Absolute humidity g/kg (DA) | $CO_2$ concentration ppm | Temperature ° CDB | Absolute humidity g/kg (DA) | $CO_2$ concentration ppm | Temperature ° CDB | Absolute humidity g/kg (DA) | $CO_2$ concentration ppm |
| (1) | 22 0 | 6.6 | 800 | 26.0 | 10.5 | 800 | 24.0 | 9.3 | 800 |
| (2) | 24.0 | 6.6 | 800 | 28.0 | 10.5 | 800 | 26.0 | 9.3 | 800 |
| (3) | 10.0 | 6.6 | 800 | 15.0 | 10.1 | 800 | 12.0 | 8.3 | 800 |
| (4) | 23.6 | 4.3 | 400 | 24.3 | 9.6 | 320 | 23.8 | 6.8 | 400 |
| (5) | 18.0 | 6.6 | 400 | 24.3 | 9.6 | 320 | 21.2 | 7.8 | 400 |
| (6) | 0.0 | 2.3 | 450 | 32.0 | 18.0 | 450 | 20.0 | 7.3 | 450 |
| (7) | 21.9 | 7.4 | 450 | 32.0 | 18.0 | 450 | 27.1 | 10.7 | 450 |
| (8) | 43.5 | 7.4 | 450 | 41.3 | 18.0 | 450 | 41.3 | 10.7 | 450 |
| (9) | 30.0 | 9.6 | 850 | 32.1 | 18.5 | 930 | 29.7 | 12.2 | 850 |
| (10) | 8.2 | 4.5 | 850 | 32.1 | 18.5 | 930 | 22.6 | 8.8 | 850 |
| (11) | 10.2 | 4.5 | 850 | 34.1 | 18.5 | 930 | 24.6 | 8.8 | 850 |

In Example 1, the total heat exchange rotor 8 is kept stationary without being rotated in the summer season, but a bypass path may be provided so as to bypass the total heat exchange rotor 8 or an intake port of the outside air OA between the preheating zone 9 of the total heat exchange rotor 8 and the heating device 6, and an exhaust port of the exhaust EA may be provided between the regeneration zone 5 of the carbon dioxide removal rotor 3 and the precooling zone 10 of the total heat exchange rotor 8. With such a configuration, by rotating and operating the total heat exchange rotor 8 throughout the year, and controlling the air volume of the air passing through the preheating zone 9 and the precooling zone 10 of the total heat exchange rotor 8 by a valve, a damper, or the like, and the air volume of the air passing through the bypass path, the intake port of the outside air OA, and the exhaust port of the exhaust EA, the enthalpy of the regeneration air sent to the regeneration zone 5 can be appropriately controlled throughout the year.

In addition, in Example 1, as the air to be treated, the total amount of return air RA from the room is used, but a part or all of the outside air OA may be taken in.

Furthermore, depending on the outside air and indoor air conditions, the configuration may be such that either one or both of the cooling device 2 and the heating device 6 are not provided, or the humidifying device 11 may not be provided.

By adopting the absorption type removal and concentration device having the configuration as in Example 1 in this manner, it is possible to provide an absorption type removal and concentration device that can be used effectively with energy-saving with a relatively simple structure and even in areas like Japan where there are four seasons and the outside air conditions change significantly during the summer, intermediate, and winter seasons.

The proposed device uses the principle of ESA with a rotor holding a carbon dioxide absorbent to absorb carbon dioxide contained in the air to be treated in the treatment zone, and to desorb carbon dioxide absorbed in the treatment zone by the water desorbed in the regeneration zone by the total heat exchanger and the regeneration air recovered heat. Therefore, the energy is saved as compared with the case where regeneration air at high temperature is used for the regeneration zone. In addition, it can be effectively used even in areas like Japan where there are four seasons, and it is possible to make an air conditioner with a relatively simple structure.

Since the treatment outlet air passed through the treatment zone of the absorption type removal and concentration device has a low carbon dioxide concentration, the carbon dioxide concentration in the room can be lowered by supplying the treatment outlet air to a room such as a building where the carbon dioxide concentration is high. In this case, since the carbon dioxide concentration in the room is lowered, the amount of outside air to be introduced can be significantly reduced, which saves energy as compared with normal ventilation. In addition, since the carbon dioxide concentration is high in the regeneration outlet air passed through the regeneration zone of the absorption type removal and concentration device, when guided to a plant growing room such as a greenhouse or a plant factory, the plants grow faster and it is possible to suppress the release of carbon dioxide to the environment. The carbon dioxide with a high concentration in the regeneration zone may be supplied to the greenhouse while removing carbon dioxide in the room using both the regeneration outlet air and the treatment outlet air. For example, in the absorption type removal and concentration device, it is also possible to circulate and air-condition carbon dioxide by air-conditioning the building with the treatment outlet air with a low concentration by removing carbon dioxide generated from humans from indoor air and supplying the regeneration outlet air with a high concentration of carbon dioxide to a greenhouse provided on the roof of the building to promote the growth of plants.

The invention claimed is:

1. An absorption removal and concentration device comprising:
    a carbon dioxide removal rotor that holds a carbon dioxide absorbent, the carbon dioxide removal rotor being divided into at least a treatment zone and a regeneration zone, air to be treated being ventilated through the treatment zone, so that carbon dioxide contained in the air to be treated is absorbed by the carbon dioxide absorbent, to separate carbon dioxide from the air to be treated and thereby produce supply air that is supplied to a supply destination, regeneration air being passed through the regeneration zone to desorb carbon dioxide absorbed by the carbon dioxide absorbent in the treatment zone thereby regenerating the carbon dioxide absorbent for the treatment zone, the regeneration zone producing a regeneration exhaust;

a total heat exchanger to recover a latent heat and a sensible heat from the regeneration exhaust produced in the regeneration zone, the latent heat and sensible heat recovered from the regeneration exhaust being supplied to the regeneration air; and a humidifying device on an outlet side of the treatment zone to humidify the supply air.

2. The absorption removal and concentration device according to claim 1, further comprising at least one of:
a cooling device to cool the air to be treated; and
a heating device to heat the regeneration air.

3. The absorption removal and concentration device according to claim 1, wherein
the total heat exchanger is a total heat exchange rotor or a static orthogonal flow heat exchanger.

4. The absorption removal and concentration device according to claim 1, wherein
the total heat exchanger is a total heat exchange rotor, and
the total heat exchange rotor is rotated in a winter season and intermediate seasons, and is stationary in a summer season.

5. The absorption removal and concentration device according to claim 1, wherein
the total heat exchanger is a total heat exchange rotor,
the total heat exchanger has a preheating zone and a precooling zone,
the regeneration exhaust produced in the regeneration zone of the carbon dioxide removal rotor is passed through the precooling zone before being exhausted,
the regeneration air is passed through the preheating zone before being sent to the regeneration zone, and
the absorption removal and concentration device further comprises at least one of:
a precooling bypass path to selectively bypass the precooling zone of the total heat exchange rotor, such that when activated, the regeneration exhaust is exhausted through the precooling bypass path without passing through the precooling zone; and
a preheating bypass path to selectively bypass the preheating zone of the total heat exchange rotor, such that when activated, the regeneration air is sent to the regeneration zone through the preheating bypass path without passing through the preheating zone.

6. The absorption removal and concentration device according to claim 1, wherein
the total heat exchanger is a total heat exchange rotor,
the total heat exchanger has a preheating zone and a precooling zone,
the regeneration exhaust produced in the regeneration zone of the carbon dioxide removal rotor is passed through the precooling zone before being exhausted,
the regeneration air is passed through the preheating zone before being sent to the regeneration zone, and
the absorption removal and concentration device further comprises:
a precooling bypass path to selectively bypass the precooling zone of the total heat exchange rotor, such that when activated, the regeneration exhaust is exhausted through the precooling bypass path without passing through the precooling zone; and
a preheating bypass path to selectively bypass the preheating zone of the total heat exchange rotor, such that when activated, the regeneration air is sent to the regeneration zone through the preheating bypass path without passing through the preheating zone.

7. The absorption removal and concentration device according to claim 1, further comprising:
an intake port to directly take in outside air, the intake port being provided between the total heat exchanger and the carbon dioxide removal rotor so that when activated, at least a portion of the regeneration air is not supplied with latent heat and sensible heat recovered from the regeneration exhaust; and
an exhaust port to directly exhaust the regeneration exhaust to outside the device so that when activated, at least a portion of the regeneration exhaust from the regeneration zone of the carbon dioxide removal rotor is exhausted to outside without having latent heat and sensible heat recovered by the total heat exchanger.

8. The absorption removal and concentration device according to claim 1, wherein
a treatment circulation system path is provided to return a part of air emitted from the treatment zone of the carbon dioxide removal rotor to a front of the treatment zone.

9. The absorption removal and concentration device according to claim 1, wherein
a regeneration circulation system path is provided to return a part of air emitted from the regeneration zone of the carbon dioxide removal rotor to a front of the regeneration zone.

10. An absorption removal and concentration device comprising:
a carbon dioxide removal rotor that holds a carbon dioxide absorbent, the carbon dioxide removal rotor being divided into at least a treatment zone and a regeneration zone, air to be treated being ventilated through the treatment zone, so that carbon dioxide contained in the air to be treated is absorbed by the carbon dioxide absorbent, to separate carbon dioxide from the air to be treated and thereby produce supply air that is supplied to a supply destination, regeneration air being passed through the regeneration zone to desorb carbon dioxide absorbed by the carbon dioxide absorbent in the treatment zone thereby regenerating the carbon dioxide absorbent for the treatment zone, the regeneration zone producing a regeneration exhaust;
a total heat exchanger to recover a latent heat and a sensible heat from the regeneration exhaust produced in the regeneration zone, the latent heat and sensible heat recovered from the regeneration exhaust being supplied to the regeneration air;
a cooling device to cool the air to be treated; and
a heating device to heat the regeneration air, wherein
the cooling device is an evaporator of a heat pump, and the heating device is a condenser of the heat pump.

11. The absorption removal and concentration device according to claim 10, wherein
the total heat exchanger is a total heat exchange rotor or a static orthogonal flow heat exchanger.

12. The absorption removal and concentration device according to claim 10, wherein
the total heat exchanger is a total heat exchange rotor, and
the total heat exchange rotor is rotated in a winter season and intermediate seasons, and is stationary in a summer season.

13. The absorption removal and concentration device according to claim 10, wherein
the total heat exchanger is a total heat exchange rotor,
the total heat exchanger has a preheating zone and a precooling zone,
the regeneration exhaust produced in the regeneration zone of the carbon dioxide removal rotor is passed through the precooling zone before being exhausted,
the regeneration air is passed through the preheating zone before being sent to the regeneration zone, and
the absorption removal and concentration device further comprises at least one of:
a precooling bypass path to selectively bypass the precooling zone of the total heat exchange rotor, such that when activated, the regeneration exhaust is exhausted through the precooling bypass path without passing through the precooling zone; and
a preheating bypass path to selectively bypass the preheating zone of the total heat exchange rotor, such that when activated, the regeneration air is sent to the regeneration zone through the preheating bypass path without passing through the preheating zone.

14. The absorption removal and concentration device according to claim 10, further comprising:
an intake port to directly take in outside air, the intake port being provided between the total heat exchanger and the carbon dioxide removal rotor so that when activated, at least a portion of the regeneration air is not supplied with latent heat and sensible heat recovered from the regeneration exhaust; and
an exhaust port to directly exhaust the regeneration exhaust to outside the device so that when activated, at least a portion of the regeneration exhaust from the regeneration zone of the carbon dioxide removal rotor is exhausted to outside without having latent heat and sensible heat recovered by the total heat exchanger.

15. The absorption removal and concentration device according to claim 10, wherein
a treatment circulation system path is provided to return a part of air emitted from the treatment zone of the carbon dioxide removal rotor to a front of the treatment zone.

16. The absorption removal and concentration device according to claim 10, wherein
a regeneration circulation system path is provided to return a part of air emitted from the regeneration zone of the carbon dioxide removal rotor to a front of the regeneration zone.

17. An absorption removal and concentration device comprising:
a carbon dioxide removal rotor that holds a carbon dioxide absorbent, the carbon dioxide removal rotor being divided into at least a treatment zone and a regeneration zone, air to be treated being ventilated through the treatment zone, so that carbon dioxide contained in the air to be treated is absorbed by the carbon dioxide absorbent, to separate carbon dioxide from the air to be treated and thereby produce supply air that is supplied to a supply destination, regeneration air being passed through the regeneration zone to desorb carbon dioxide absorbed by the carbon dioxide absorbent in the treatment zone thereby regenerating the carbon dioxide absorbent for the treatment zone, the regeneration zone producing a regeneration exhaust; and
a total heat exchanger to recover a latent heat and a sensible heat from the regeneration exhaust produced in the regeneration zone, the latent heat and sensible heat recovered from the regeneration exhaust being supplied to the regeneration air, wherein
the total heat exchanger is a total heat exchange rotor, and
the total heat exchange rotor is rotated in a winter season and intermediate seasons, and is stationary in a summer season.

18. The absorption removal and concentration device according to claim 17, further comprising at least one of:
a cooling device to cool the air to be treated; and
a heating device to heat the regeneration air.

19. The absorption removal and concentration device according to claim 17, wherein
the total heat exchanger is a total heat exchange rotor,
the total heat exchanger has a preheating zone and a precooling zone,
the regeneration exhaust produced in the regeneration zone of the carbon dioxide removal rotor is passed through the precooling zone before being exhausted,
the regeneration air is passed through the preheating zone before being sent to the regeneration zone, and
the absorption removal and concentration device further comprises at least one of:
a precooling bypass path to selectively bypass the precooling zone of the total heat exchange rotor, such that when activated, the regeneration exhaust is exhausted through the precooling bypass path without passing through the precooling zone; and
a preheating bypass path to selectively bypass the preheating zone of the total heat exchange rotor, such that when activated, the regeneration air is sent to the regeneration zone through the preheating bypass path without passing through the preheating zone.

20. The absorption removal and concentration device according to claim 17, further comprising:
an intake port to directly take in outside air, the intake port being provided between the total heat exchanger and the carbon dioxide removal rotor so that when activated, at least a portion of the regeneration air is not supplied with latent heat and sensible heat recovered from the regeneration exhaust; and
an exhaust port to directly exhaust the regeneration exhaust to outside the device so that when activated, at least a portion of the regeneration exhaust from the regeneration zone of the carbon dioxide removal rotor is exhausted to outside without having latent heat and sensible heat recovered by the total heat exchanger.

21. The absorption removal and concentration device according to claim 17, wherein
a treatment circulation system path is provided to return a part of air emitted from the treatment zone of the carbon dioxide removal rotor to a front of the treatment zone.

22. The absorption removal and concentration device according to claim 17, wherein
a regeneration circulation system path is provided to return a part of air emitted from the regeneration zone of the carbon dioxide removal rotor to a front of the regeneration zone.

* * * * *

UNITED STATES PATENT AND TRADEMARK OFFICE
CERTIFICATE OF CORRECTION

PATENT NO. : 12,023,625 B2  
APPLICATION NO. : 17/637709  
DATED : July 2, 2024  
INVENTOR(S) : Koji Inoue Page 1 of 1

It is certified that error appears in the above-identified patent and that said Letters Patent is hereby corrected as shown below:

In the Specification

Column 1, Line 10:
Delete "Mar. 11, 2019," and insert --Mar. 11, 2020,--.

Signed and Sealed this
Twenty-seventh Day of August, 2024

Katherine Kelly Vidal
*Director of the United States Patent and Trademark Office*